(12) United States Patent
Bai et al.

(10) Patent No.: US 10,050,921 B2
(45) Date of Patent: Aug. 14, 2018

(54) ANALYZING EMAIL THREADS

(71) Applicant: International Business Machines Corporation, Armonk, NY (US)

(72) Inventors: Song Bai, Beijing (CN); Ming Qun Chi, Beijing (CN); Hui Huang, Beijing (CN); Hui Liu, Beijing (CN); Xiang Xing Shi, Beijing (CN); Ang Yi, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 14/671,468

(22) Filed: Mar. 27, 2015

(65) Prior Publication Data

US 2016/0283071 A1 Sep. 29, 2016

(51) Int. Cl.
| | |
|---|---|
| *H04L 12/58* | (2006.01) |
| *G10L 25/63* | (2013.01) |
| *G06F 17/27* | (2006.01) |
| *G06F 3/0481* | (2013.01) |

(52) U.S. Cl.
CPC ............. *H04L 51/22* (2013.01); *H04L 51/16* (2013.01)

(58) Field of Classification Search
None
See application file for complete search history.

(56) References Cited

U.S. PATENT DOCUMENTS

| 8,412,782 | B2 | 4/2013 | Chi et al. |
| 8,438,037 | B2 | 5/2013 | Cates et al. |
| 8,805,937 | B2 | 8/2014 | Bendel et al. |
| 9,395,865 | B2 * | 7/2016 | Chang ................ G06F 3/048 |
| 2003/0236659 | A1 * | 12/2003 | Castellanos ........ G06F 17/271 704/4 |
| 2005/0125216 | A1 * | 6/2005 | Chitrapura ........ G06F 17/2785 704/1 |
| 2006/0178868 | A1 * | 8/2006 | Billerey-Mosier . G06F 17/2881 704/9 |
| 2009/0055484 | A1 * | 2/2009 | Vuong ................ G06Q 10/107 709/206 |

(Continued)

OTHER PUBLICATIONS

Gupta et al., "Emotion Detection in Email Customer Care", Computational Intelligence, 2010. vol. 59, No. 000. 14 pages. Copyright 2010 The Authors. Journal Compilation, Copyright, 2010 Wiley Periodicals, Inc.

(Continued)

*Primary Examiner* — Jeffrey A Gaffin
*Assistant Examiner* — Nhat Huy T Nguyen
(74) *Attorney, Agent, or Firm* — Jared L. Montanaro

(57) ABSTRACT

An emotion function chain may be generated from an email thread and displayed to a user in one or more windows on a computer display of a computer system. An email content analyzer may extract emotion indicators from the body of an email within the email thread. Using the emotion indicators, an attitude factor for an email may be determined. The attitude factors determined from each email within the email thread may be pictorially depicted in the emotion function chain. In response to a user interaction with a pictorial depiction of an attitude factor within the emotion function chain, a second window may generated to display the body of the email used to calculate the attitude factor interacted with.

14 Claims, 9 Drawing Sheets

(56) References Cited

U.S. PATENT DOCUMENTS

| | | | |
|---|---|---|---|
| 2010/0281258 A1* | 11/2010 | Andress | H04L 63/0281 |
| | | | 713/168 |
| 2011/0065082 A1* | 3/2011 | Gal | G09B 7/02 |
| | | | 434/365 |
| 2014/0244264 A1 | 8/2014 | Thirumalainambi et al. | |
| 2014/0297764 A1 | 10/2014 | Skiba et al. | |
| 2015/0007050 A1* | 1/2015 | Jakobson | H04L 51/16 |
| | | | 715/752 |
| 2015/0271119 A1* | 9/2015 | Goncalves | H04L 51/16 |
| | | | 709/206 |

OTHER PUBLICATIONS

Bai, et al., "Analyzing Email Threads", U.S. Appl. No. 15/064,707, filed Mar. 9, 2016.
List of IBM Patents or Patent Applications Treated as Related, dated Mar. 8, 2016. 2 pages.

* cited by examiner

Positive Words

502 { ID : 00001
Name : Excellent
Weight : 3

504 { ID : 0002
Name : Congratulation
Weight : 2

Negative Words

506 { ID : 00001
Name : Ugly
Weight : 1

508 { ID : 00002
Name : Doubt
Weight : 1

FIG. 5

ANALYZING EMAIL THREADS

BACKGROUND

The present disclosure relates generally to data processing, and more particularly, to analyzing email threads. With the advent of computers and the Internet, sharing information and communicating around the world has become instantaneous. However, due to the ease of communication, it is important to effectively communicate in a manner that takes into account the emotions of those communicating with one another. Ascertaining the sentiments of an email sent by a user can be challenging, especially if a user is communicating with another user in a second language.

SUMMARY

Aspects of the present disclosure may include a computer implemented method for generating an emotion function chain from an email thread. The method can include receiving an email thread comprising at least a first email and a second email at an email content analyzer on an email application hosted by a computer system. In response to receiving the email thread, a first set of emotion indicators from a body of the first email and a second set of emotion indicators from a body of a second email may be extracted. Based upon the sets of emotion indicators, a first attitude factor for the first email and a second attitude factor for the second email may be determined. Utilizing the first attitude factor and the second attitude factor, an emotion function chain may be generated and displayed in a first window on a computer display of the computer system. In embodiments, the emotion function chain may include a pictorial depiction of the attitude factor for the first email and a pictorial depiction of the attitude factor for the second email. In various embodiments, in response to a user interaction with the pictorial depiction of the attitude factors, the body of the email used to calculate an attitude factor may be displayed in a second window on the computer display.

Aspects of the present disclosure may include a computer program product for displaying an emotion function chain from an email thread. The computer program product includes a computer readable storage medium having program instructions embodied therewith, wherein the computer readable storage medium is not a transitory signal per se, the program instructions executable by a processor to cause the processor to perform a method. The method can include receiving an email thread comprising at least a first email and a second email at an email content analyzer on an email application hosted by a computer system. In response to receiving the email thread, a first set of emotion indicators from a body of the first email and a second set of emotion indicators from a body of a second email may be extracted. Based upon the sets of emotion indicators, a first attitude factor for the first email and a second attitude factor for the second email may be determined. Utilizing the first attitude factor and the second attitude factor, an emotion function chain may be generated and displayed in a first window on a computer display of a computer system. In embodiments, the emotion function chain may include a pictorial depiction of the attitude factor for the first email and a pictorial depiction of the attitude factor for the second email. In various embodiments, in response to a user interaction with the pictorial depiction of the attitude factors, the body of the email used to calculate an attitude factor may be displayed in a second window on the computer display.

Aspects of the present disclosure may include a computer implemented system for generating an emotion function chain from an email thread. The system includes a memory. The system also includes a processor in communication with the memory, wherein the processor is configured to perform a method. The method can include receiving an email thread comprising at least a first email and a second email at an email content analyzer on an email application hosted by the computer system. In response to receiving the email thread, a first set of emotion indicators from a body of the first email and a second set of emotion indicators from a body of a second email may be extracted. Based upon the sets of emotion indicators, a first attitude factor for the first email and a second attitude factor for the second email may be determined. Utilizing the first attitude factor and the second attitude factor, an emotion function chain may be generated and displayed in a first window on a computer display of the computer system. In embodiments, the emotion function chain may include a pictorial depiction of the attitude factor for the first email and a pictorial depiction of the attitude factor for the second email. In various embodiments, in response to a user interaction with the pictorial depiction of the attitude factors, the body of the email used to calculate an attitude factor may be displayed in a second window on the computer display.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 5 illustrates an example of pseudocode that forms the emotion indicator dictionary, according to embodiments.

Figure 1:
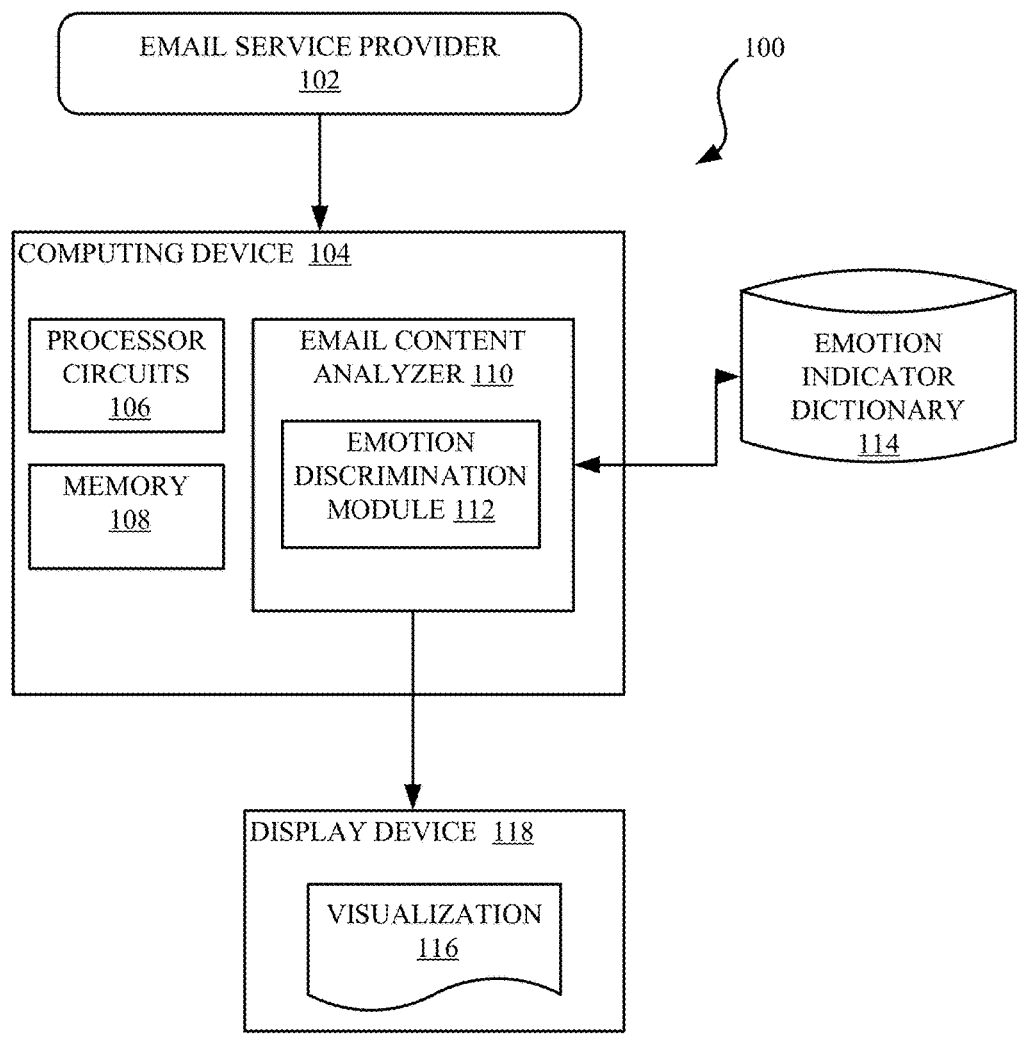
FIG. 1 depicts a high-level block diagram of a system for generating an emotion function chain from an email thread, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure include a computer implemented method, system, and computer program product for generating an emotion function chain from an electronic mail (e.g., email) thread. The computer implemented method, system, and product may allow an individual/entity to view a generated emotion function chain, which may pictorially depict the attitude factors of senders communicating in an email thread in a window. The emotion function chain may include one or more windows, where based upon a user interaction with a pictorially depicted attitude factor, a user may view the body of an email used to calculate the attitude factor in an additional, separate window. The attitude factor of a participant in an email thread may be calculated by referencing an emotion indicator dictionary. In certain embodiments, the emotion indicator dictionary may be used to identify emotion indicators within the body of an email, and assign weight values to the identified emotion indicators. The emotion indicators with assigned weight values may be used to determine the attitude factor of a participant in the email thread. While the present disclosure is not necessarily limited to such applications, various aspects of the disclosure may be appreciated through a discussion of various examples using this context.

Various embodiments of the present disclosure are directed towards facilitating the conveyance of attitude factors of email thread participants by generating an emotion function chain in a display. If a user receives an email thread with a long discussion history, it can be difficult, especially in the situation where the user is communicating in a second language, for the user to quickly ascertain the basic attitudes (e.g., sentiments) of all participants in the email thread without having to go through the entire long discussion history. In various embodiments, the body of an email written by a participant of an email thread may be analyzed in order to generate an attitude factor to be depicted in an emotion function chain in a display.

In certain situations, it may be desirable to be able to understand the context of a particular attitude factor calculated for a particular participant in the email thread. For example, in response to a user interaction (e.g., selecting/clicking the images) with a pictorial depiction of an attitude factor of an emotion function chain, the computer may generate a second window in which to display the body of the email used to calculate the selected attitude factor. In various embodiments, in the second window displaying the body of the email, the emotion indicators identified within the body of the email may be visually differentiated (e.g., highlighting emotion indicators with a color schema, underlined).

In various embodiments, an email content analyzer may receive an email thread comprising at least a first email and a second email. In certain embodiments, an email thread may contain a plurality of emails. In response to receiving the email thread, a first set of emotion indicators may be extracted from the body of the first email and a second set of emotion indicators may be extracted from the body of the second email. In embodiments, the first set of emotion indicators from the first email may include one or more words (e.g., a laudatory phrase such as "good job") from the body of the first email and the second set of emotion indicators from the second email may include one or more words (e.g., a critical word such as "disappointed") from the body of the second email.

Aspects of the present disclosure may include determining an attitude factor for the first email (e.g., happy) and an attitude factor for the second email (e.g., angry). The attitude factor for the first email may be based upon the first set of emotion indicators identified and extracted from the first email and the attitude factor for the second email may be based upon the second set of emotion indicators identified and extracted from the second email. An attitude factor may be a numerical value. In embodiments, determining an attitude factor may include receiving weight values from an emotion indicator dictionary for each emotion indicator identified. The emotion indicator dictionary may be a collection of emotion indicators with preassigned weight values. The weight values may be based upon both a degree of feeling (e.g., modest, relaxed, proactive) and degree of tone (e.g., positive, comparative, superlative). Using the emotion indicators and their respective weight values, a probability of emotion value of the first email and a probability of an emotion value of the second email may be calculated. In certain embodiments, the probability of an emotion value may be an amount of positivity or negativity associated with the emotion indicators extracted from the body of an email. An attitude factor may be calculated using the probability of an emotion value.

Aspects of the present disclosure may include displaying in a first window, based upon the determined attitude factors, an emotion function chain including a pictorial depiction of the attitude factor for the first email and a pictorial depiction of the attitude factor for the second email. In embodiments, the pictorial depiction of the attitude factor may be a visual indication of the sentiment of a sender participating in an email thread (e.g., a smiley face for a calculated attitude factor of "happy"). The pictorial depictions of the attitude factors may be stored in an allocated repository and may be organized according to the numerical value associated with the attitude factor. For example, a smiley face pictorial depiction may be grouped with an attitude factor numerical value greater than 1 and a blank face pictorial depiction may be grouped with an attitude factor numerical value less than 1 but greater than −1. In embodiments, from a generated emotion function chain, a pictorial depiction of an attitude factor and the numerical value associated with the attitude factor calculation may be recorded and stored within an allocated repository for future retrieval. For instance, if a numerical value for an attitude factor of an email in a previously generated emotion function chain is the same numerical value for an attitude factor for an email currently being generated, the pictorial depiction of the attitude factor for the email in the previously generated emotion function chain may be retrieved from the allocated repository and may be used as the same pictorial depiction for the attitude factor currently being generated.

In further embodiments, the pictorial depiction of the attitude factor may be displayed as a module with a textual tag. The module may be visually differentiated based upon the calculated attitude factor (e.g., module colored red for a calculated attitude factor of "angry"). The textual tag may refer to the sender class of the participant. A sender class of a participant in an email thread can be the scope of their employment. The sender class of a participant in an email thread may be determined from information contained within the email written by the participant. For example, the textual tags of an employee of a corporation and a client of a corporation for a generated emotion function chain may be "engineer" and "client", respectively based upon the signature blocks of the employee of the corporation and the client of the corporation. In various embodiments, the sender class of a participant in an email thread may be determined based upon information contained within a local intranet. For example, an email participant "John Doe" and information associated with John Doe may be stored within a social networking service used by the company John Doe works for. In embodiments, a sender class may be user defined.

Additionally, a first sender of a first email and a second sender of a second email may be grouped into a category. A category may group sender classes together based upon a common attribute. In embodiments, the category may be user defined. For example, a distribution list may be used to categorize recipients as members of a particular group, like "xyz corporation" or "family." In certain embodiments, a user may choose to generate an emotion function chain based upon a category and/or sender class. A user may, after an emotion function chain has been generated, selectively add or remove participants pictorially depicted as attitude factors in an emotion function chain based upon their sender class or category.

The pictorial depiction of the attitude factor for the first email and the pictorial depiction of the attitude factor for the second email may be displayed in a manner which represents the relationship between the first email and the second email. For example, the attitude factor for the first email may be connected to the attitude factor for the second email by way of a marker (e.g., pointed arrow) to represent that the second email was a reply to the first email. In certain embodiments, the first email and the second email may be nonconsecutive within the email thread. A pictorial depiction of an attitude factor may be visually differentiated from other attitude factors. For instance, if the attitude factor for the first email was positive (e.g., happy), the pictorial depiction of the attitude factor may be displayed in a color representative of a positive sentiment (e.g., green).

Aspects of the present disclosure may include displaying in a second window, in response to a user interaction with the pictorial depiction of the attitude factor for an email, the body of an email used to calculate the attitude factor. In embodiments, the pictorially depicted attitude factor may include a hotlink. For example, if a user selected or clicked on an attitude factor, a second window may be generated displaying the body of the email. In certain embodiments, displaying the body of the email may include visually differentiating emotion indicators identified in the email from the body of the email. For instance, the words from the body of an email used to calculate an attitude factor may be highlighted such that a user may understand the context of the attitude factor for a sender in an email thread.

FIG. 1 depicts a high-level block diagram of a system 100 for generating an emotion function chain from an email thread, according to embodiments. The system 100 utilizes a computing device 104 to create a visualization 116 based on input from an email service provider 102 and an emotion indicator dictionary 114.

The email service provider 102 can be a mail service provider. In embodiments, the email service provider may include messaging servers to send, receive, accept and store email. In certain embodiments, components of the illustrated diagram may exist on the same or a plurality of separate networks. A network may include the Internet, a local area network, a wide area network and/or a wireless network. In various embodiments, components of the illustrated diagram may be implemented under a client-server model. For example, a situation may occur where a customer of a corporation wishes to generate an emotion function chain based upon an email thread where some of the participants of the email thread are employees of the corporation. In various embodiments, information may be extracted and processed on one server (e.g., a simple mail transfer protocol server) and the analysis results may be sent to the customer for rendering on another server (e.g., a client machine). The exchange of information (e.g., analysis results) may be communicated in an extensible markup language (XML) or other similar network communication format.

The emotion indicator dictionary 114 may be an allocated repository of known emotion indicators with preassigned weight values. The weight values may be based upon an authoritative source definition of a word (e.g., a well-respected dictionary) as well as the intensity of the word when used in a specific context. In embodiments, the emotion indicator dictionary 114 may dynamically expand and revise. For example, over a period of time, the emotion indicator dictionary may constantly monitor which weight values are assigned to which emotion indicators to more accurately assign weight values in subsequent analyses. The emotion indicator dictionary 114 may be used to determine the emotion value of an email. In certain embodiments, the emotion indicator dictionary 114 may be used to determine the attitude factor of an email.

The computing device 104 may include one or more processor circuits 106, and memory 108. The one or more processor circuits 106 may be a device that is configured to perform processing for the computing device 104 (e.g., a central processing unit). The memory 108 may be communicatively coupled to the one or more processor circuits 106. The memory 108 may include an allocated repository for storing data. The memory 108 may store various instructions for the one or more processor circuits 106 to process. The one or more processor circuits 106 may perform the processing of an email content analyzer 110. The computing device 104 may be both local and co-located with the email service provider 102. In various embodiments, the computing device 104 may be the email service provider 102. In certain embodiments, the memory 108 may store data received at the email content analyzer 110 and the emotion discrimination module 112 in the allocated repository. In further embodiments, the memory 108 may store data transmitted from the email content analyzer 110 and the emotion discrimination module 112 in the allocated repository. The data stored in the allocated repository is discussed with further detail herein.

The email content analyzer 110 may be used to create the visualization 116 from data received from the email service provider 102 using the emotion indicator dictionary 114. The email content analyzer 110 may perform various operations as described herein. The email content analyzer 110 may receive data (e.g., email threads) from the email service provider 102 and, using the emotion indicator dictionary, identify sets of emotion indicators within the body of each email within the email thread. The email content analyzer may, in response to identifying the sets of emotion indicators, extract the sets of emotion indicators from the bodies of the emails within the email thread. If sets of emotion indicators are identified for each email within an email thread, the emotion indicator dictionary 114 may be used to assign weight values to each emotion indicator within each set of emotion indicators.

In various embodiments, the email content analyzer 110 has an emotion discrimination module 112. The emotion discrimination module 112 may receive, from the email content analyzer 110, sets of identified emotion indicators with assigned weight values. The emotion discrimination module 112 may, using the identified emotion indicators and their respective weight values, determine a probability of an emotion value for each identified set of emotion indicators. In certain embodiments, the emotion discrimination module 112 may utilize the probability of an emotion value for each identified set of emotion indicators to calculate the attitude factor for the email. For example, a probability of an emotion value score of "1" may result in a calculated attitude factor of "Happy" whereas a probability of an emotion value score of "−1" may result in a calculated attitude factor of "Sad." In further embodiments, a probability of an emotion value score may be "0." Consequently, a probability of an emotion value score of "0" may result in a calculated attitude factor of "Pending." An attitude factor calculated to be "pending" may indicate that the emotion indicator has not been previously identified or it may indicate that the probability of an emotion value score for positive emotion indicators identified within an email is equal the probability of an emotion value score for negative emotion indicators identified within the same email.

The computing device 104 may output a visualization 116 that is produced by the email content analyzer 110 and the emotion discrimination module 112 using the emotion indicator dictionary 114. In embodiments, the display device 118 (e.g., a monitor) may include a graphical user interface or similar viewing apparatus. The visualization 116 may be a visual conveyance of the data received from the email service provider 102. For example, the visualization 116 may be displayed on a graphical user interface which the display device 118 relates to a user. In certain embodiments, the visualization 116 may be an emotion function chain. A user of the computing device 104 may interact with the visualization 116. Based upon a user interaction with the visualization 116, the display device 118 may include a plurality of windows associated with the visualization 116. For example, if an emotion function chain is generated and a user selects a pictorially depicted attitude factor for a first email and a pictorially depicted attitude factor for a second email, the bodies of the first email and the second email may be displayed in separate windows within the display device 118. In certain embodiments, the bodies of the first email and the second email may be connected to the emotion function chain. For instance, the additional windows generated may be viewable by a user interacting with labeled tabs at the bottom of the emotion function chain window.

Figure 2:
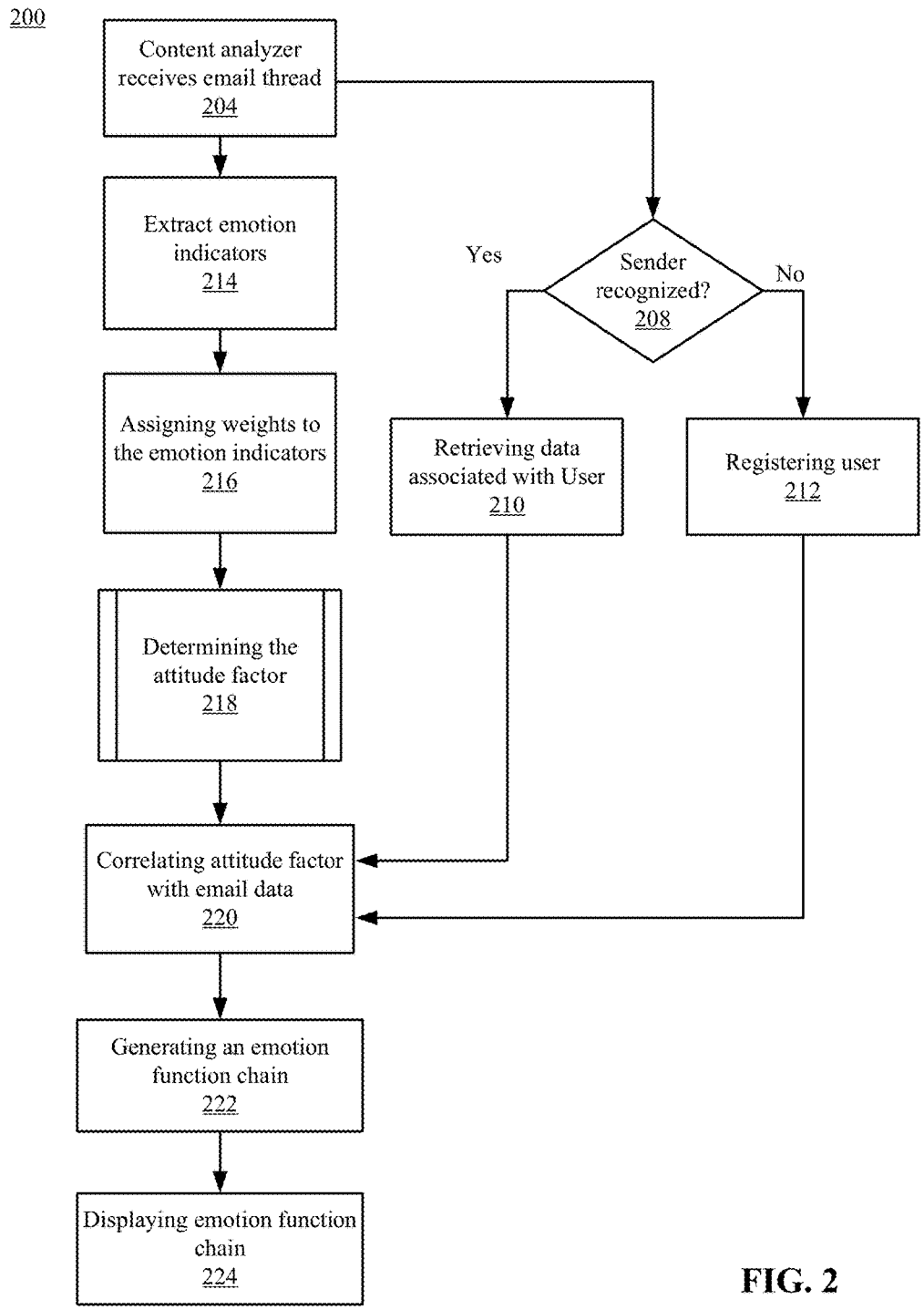
FIG. 2 is a flowchart illustrating a method for generating an emotion function chain from an email thread, according to embodiments.

FIG. 2 illustrates a flowchart of a method 200 for generating an emotion function chain from an email thread, according to embodiments. The method 200 involves receiving an email thread at an email content analyzer, extracting emotion indicators, assigning weights to the emotion indicators, calculating an attitude factor, generating an emotion function chain, and displaying the emotion function chain. The method 200 may additionally include retrieve data associated with a user previously registered and registering a new user. In embodiments, registering a new user may include collecting information associated with a participant of an email thread to create a sender class. Aspects of the method 200 may be similar or the same as aspects performed by the email content analyzer in FIG. 1.

The method 200 may begin at operation 204. In operation 204, an email content analyzer may receive an email thread. An email thread may include, according to various embodiments, a collection of one or more communications from one or more participants. The email content analyzer may receive the email thread from an email service provider. In certain embodiments, a request to send an email thread to the email content analyzer may be initiated by a user.

In operation 208, data may be collected from an email within an email thread. The data collected from the email within the email thread may be cross referenced with an allocated repository containing data of known users. Aspects of FIG. 2 may be similar or the same as aspects described in FIG. 1 with respect to the memory 108.

The data of a user associated with an email can include professional occupation (e.g., job description) or contact information (e.g., telephone number). For instance, if the email content analyzer received an email thread where each email had a signature line, the information contained within the signature line may be used to determine the sender class to which each user belongs. For example, if an email thread contained two participants (e.g., users) from two separate companies, and one participant has a signature line stating "Kent Brockman, Manager" and the other participant has a signature line stating "Carl Carlson, Acquisitions", it may be determined that the sender classes for Kent Brockman and Carl Carlson are "Manager" and "Customer", respectively. In embodiments, the data collected from the email may be used to update previously collected data stored within the allocated repository containing data of known users.

In operation 210, if a user is recognized in operation 208, data associated with the identified user may be retrieved from the allocated repository containing data of known users. In embodiments, the data of a user associated with an email may have been previously collected through a private intranet and stored in the allocated repository containing data of known users. For example, if a company has a private intranet, data collected from an email associated with a user may be compared with data stored in the allocated repository of known users in operation 208. Continuing the example, in operation 210, any additional data associated with the user may be retrieved from the private intranet. For example, if a signature line stated "Kent Brockman, XYZ Corp.", operation 208 may be determine that the user "Kent Brockman" has data stored within the allocated repository containing data of known users and in operation 210, it may be determined that "Kent Brockman" is a member of the sender class "Manager" by cross referencing data contained within the XYZ Corp. network (e.g., intranet). The data collected from the email as well as the data from the allocated repository containing data of known users may be grouped together for future correlation in operations within the method 200.

In operation 212, if a user is not recognized in operation 208, the data collected in operation 208 may be used to register a new user with the allocated repository containing data of known users. For example, if Carl Carlson has not been registered, any information associated with Carl Carlson that can be collected from the email sent by him may be used to register Carl Carlson with the allocated repository of known users. Data collected from an email associated with a new user may be stored in the allocated repository of known users and may be retrieved in future operations within the method 200.

In operation 214, emotion indicators may be extracted from each email within the email thread. In embodiments, extracting the emotion indicators from each email within the email thread may include utilizing a natural language processing technique to analyze syntactic and semantic content. The natural language processing technique may be configured to parse structured data (e.g., tables, graphs) and unstructured data (e.g., textual content containing words, numbers). In certain embodiments, the natural language processing technique may be a software tool or other program configured to analyze and identify the semantic and syntactic elements and relationships present in the within the body of each email.

More particularly, the natural language processing technique can be configured to parse the grammatical constituents, parts of speech, context, and other relationships (e.g., modifiers) to identify emotion indicators. The natural language processing technique can be configured to recognize keywords, contextual information, and metadata tags associated with emotional words, phrases, or sentences. In certain embodiments, the natural language processing technique can analyze summary information, keywords, figure captions, or text descriptions included in the body of an email, and identify syntactic and semantic elements for an emotion indicator. The syntactic and semantic elements can include information such as word frequency, word meanings, text font, italics, hyperlinks, proper names, noun phrases, parts-of-speech, or the context of surrounding words. Other syntactic and semantic elements are also possible.

For example, if the body of an email contained the sentence: "Great job on this project, I am happy with the result" the natural language processing technique may determine that "great job" and "I am happy" are emotion indicators.

In operation 216, the identified and extracted emotion indicators may be assigned weight values using the emotion indicator dictionary. Aspects of the method 200 may be similar or the same as aspects described in FIG. 1 with respect to the emotion indicator dictionary 114. For example, using the example described above, the identified emotion indicators "great job" and "I am happy" may be assigned weight values of "2" and "1", respectively. In certain embodiments, the emotion indicator dictionary may be continually updated based upon previous weight assignment values and the frequency with which an emotion indicator is used. For instance, if the emotion indicator "great job" is used more often than the emotion indicator "I am happy" and if the emotion indicator "great job" is frequently grouped into a set of emotion indicators associated with positivity, the emotion indicator dictionary may determine that "great job" may be worth a weight value of "3" instead of "2".

In operation 218, an attitude factor for an email may be determined at an emotion discrimination module. Aspects of method 200 may be similar or the same as aspects described in FIG. 1 with respect to the emotion discrimination module 112. In embodiments, the emotion discrimination module may receive extracted emotion indicators and their assigned weight values from an email content analyzer. Using emotion indicators and their respective weight values, an attitude factor may be calculated for each email within an email thread. In various embodiments, the results from the attitude factor calculation may be used for both updating the emotion indicator dictionary and the data associated with a user. For example, the data associated with a user may include previous attitude factor calculation results.

In operation 220, the attitude factor for each email from an email thread calculated in operation 218 and the data of each user associated with each email collected at operations 208, 210 or 212 may be grouped together. For example, an email by Kent Brockman within an email thread may group the following information together in operation 220: Participant: Kent Brockman; Attitude Factor: Happy; Sender Class: Manager; Category: XYZ Corp. In embodiments, the body of the original email may be grouped with the attitude factor and the data of each user. In certain embodiments, the emotion indicators extracted from the body of the email may be visually differentiated within the original body of the email. Visually differentiating may include highlighting emotion indicators using different colors based upon the sentiment of the word. For example, "great job" may be highlighted in a green color whereas "I am disappointed" may be highlighted in a red color. The group of information may be stored in an allocated repository within the emotion discrimination module for future retrieval.

In operation 222, an emotion function chain may be generated. Generating an emotion function chain may include recording any data used to generate the emotion function chain. For example, the emotion indicators, the data used to calculate attitude factors, and data associated with a user may be recorded and stored for future retrieval. In embodiments, data recorded in operation 222 may be utilized in the future for operation 210.

In operation 224, the emotion function chain may be related to a user through a display device. Aspects of method 200 may be similar or the same as aspects described in FIG. 1 with respect to the visualization 116. In embodiments, the emotion function chain may display the calculated attitude factor for each email with the data of each user associated with the email. In certain embodiments, the emotion function chain may contain one or more windows linking depicted attitude factors with the bodies of the emails used to calculate the attitude factors. In further embodiments, the depicted attitude factors within the emotion function chain may be visually differentiated according to the sentiment they represent (e.g., red for angry, green for happy, yellow for indifferent). The emotion function chain and the manner in which how it may be displayed is discussed with additional details further herein.

Figure 3:
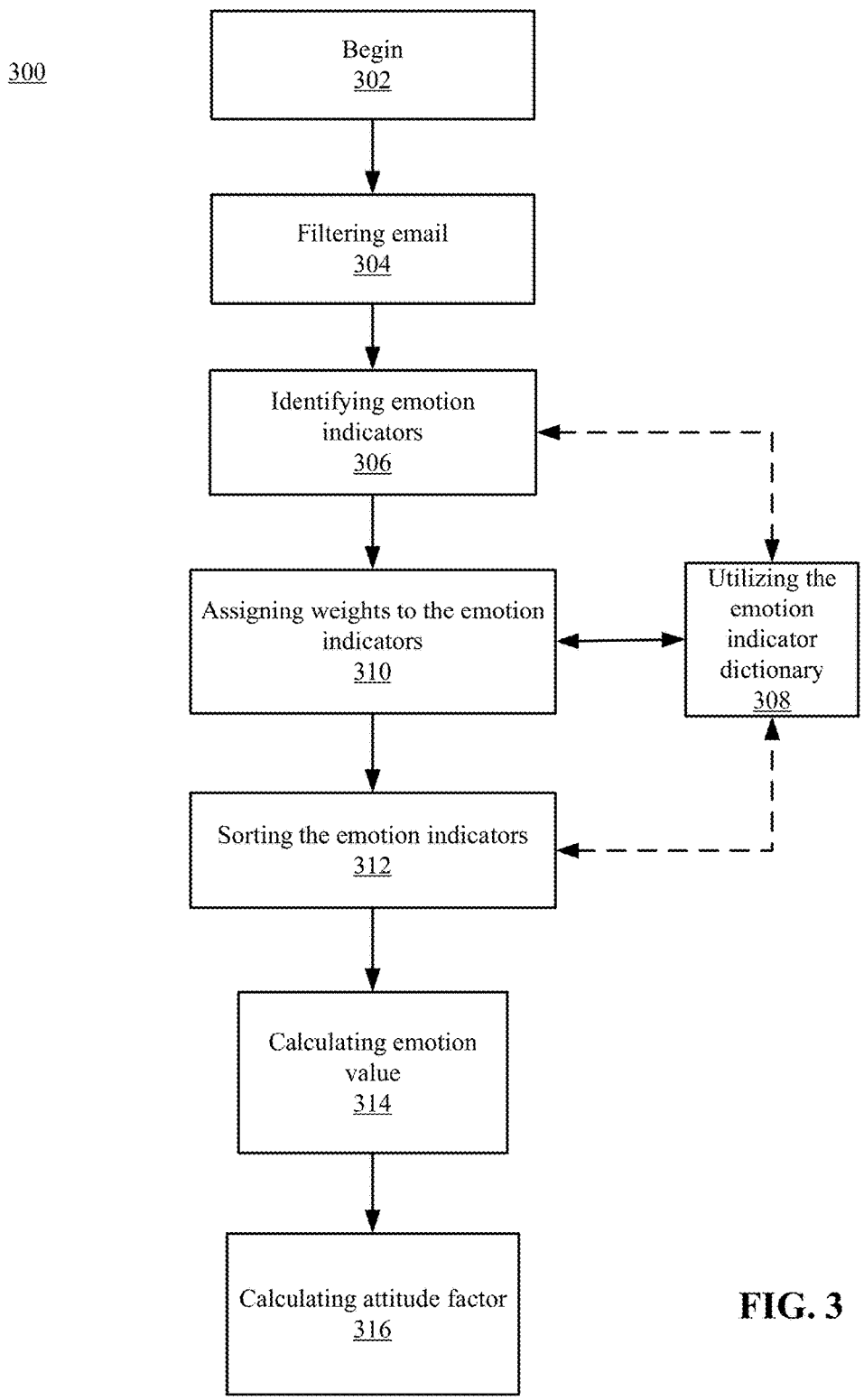
FIG. 3 is a flowchart illustrating a method for determining the attitude factor for the sender of an email, according to embodiments.

FIG. 3 illustrates a flowchart of a method 300 for determining the attitude factor for the sender of an email, according to embodiments. The method 300 involves filtering the body of an email, identifying emotion indicators, assigning weights to the emotion indicators, sorting emotion indicators into groups, calculating an emotion value, and using the calculated emotion value to determine an attitude factor. Aspects of the method 300 may be similar or the same as aspects performed by the emotion discrimination module in FIG. 1 and aspects of method 300 may be similar or the same as aspects performed in operation 218 in FIG. 2.

The method 300 may begin at operation 302. In embodiments, the method 300 may be initiated when an email thread is received at an email content analyzer. The method 300 may calculate the attitude factor for each email within an email thread. In operation 304, each email within an email thread may be filtered. In embodiments, filtering an email may include removing function words. Function words may serve to express grammatical relationships with other words within a sentence. For example, function words may include articles, pronouns, adpositions, conjunctions, auxiliary verbs, interjections, particles, expletives and pro-sentences. Function words may or may not be inflected or have affixes, depending upon the language (e.g., English, Mandarin, etc.) of the emails within the email thread. For instance, in the sentence "Congratulations on this great achievement", the words "on" and "this" may be identified as function words and may be filtered from the sentence.

In operation 306, emotion indicators may be identified within the body of an email. Aspects of the method 300 may be similar or the same as aspects described in method 200 with respect to the natural language processing performed in operation 214. In embodiments, the emotion indicators may be identified by utilizing an emotion indicator dictionary in operation 308. For example, using the example sentence above "Congratulations on this great achievement", the words "Congratulations", "great" and "achievement" may be identified as emotion indicators. Aspects of method 300 may be similar or the same as aspects as described in FIG. 1 with respect to the emotion indicator dictionary 114 and in FIG. 2 with respect to operation 216. In various embodiments, once the emotion indicators are identified, the number of emotion indicators may be counted for further analysis. For instance, the number of emotion indicators identified may be utilized to determine the probability of an emotion value of an email.

In operation 310, identified emotion indicators may be assigned weight values by utilizing an emotion indicator dictionary. Aspects of method 300 may be similar or the same aspects as described in FIG. 1 with respect to the emotion indicator dictionary 114 and in FIG. 2 with respect to operation 216. Each emotion indicator identified may be assigned a weight value. In embodiments, the weight values may be representative of emotional intensity. For instance, the degree of the word "excellent" is stronger than the degree of the word "good." In further embodiments, a word may be identified as an emotion indicator but may go unrecognized by the emotion indicator dictionary. The unrecognized word and the context in which it was used may be analyzed using natural language processing and may be stored in the emotion indicator dictionary for future comparisons. For example, if the word "wary" is identified as an emotion indicator but is not a part of the emotion indicator dictionary, the sentence in which the word "wary' was used (e.g., the workers are wary of the requested changes) may be analyzed and the results from the analysis may be stored in the emotion indicator dictionary (e.g., it may be determined that due to the context, the word "wary" has a negative association).

In operation 312, the identified emotion indicators may be sorted into groups. Identified emotion indicators may be sorted into groups each time an email from an email thread is analyzed. In embodiments, the identified emotion indicators may be sorted into two or more groups. In certain embodiments, the identified emotion indicators may be sorted into a positive group and a negative group using the emotion indicator dictionary. Emotion indicators may be sorted into a positive group or a negative group based upon their authoritative source definition. In various embodiments, emotion indicators may be sorted into a positive or negative group based upon previous assessments of emotion indicators. For example, in the sentence "After a disappointing previous year, I am happy with your current results", "disappointing", "I am happy" and "results" may be identified as emotion indicators. After identifying the emotion indicators, the emotion indicator "I am happy" may be sorted into the positive group whereas the emotion indicator "disappointing" may be sorted into the negative group. The emotion indicator "results" may be considered positive or negative, depending upon the context. In embodiments, if an identified emotion indicator does not have a definitive positive or negative sentiment, it may be sorted into a "pending' group, where the sentiment of the emotion indicator is unknown or undefined.

In operation 314, the probability of an emotion value may be determined. In embodiments, the probability of an emotion value may be based upon the groups which the identified emotion indicators were sorted into. The probability of an emotion value may be a numerical value indicating the intensity of a group of emotion indicators. In certain embodiments, the probability of an emotion value for a group of emotion indicators may include determining the probability of an emotion value for each emotion indicator sorted into a positive group and negative group. For instance, the probability of an emotion value for a group of positive emotion indicators may be "P(pos)=$\Sigma_{k=0}^{n}(W_k \times P_k)$", where "k" refers to an emotion indicator, "$W_k$" refers to the weight value assigned to the emotion indicator, and "$P_k$" refers to the frequency by which an emotion indicator is used as it relates to the total number of emotion indicators within an email. In embodiments, the same equation may be utilized for an identified group of negative emotion indicators. The equation above is a single example and nothing in the invention is limited to the formula discussed above.

For example, an email thread may be received by an email content analyzer, where the body of an email within the email thread contains 100 words. From the 100 words, 20 emotion indicators may be identified and extracted. Within the 20 emotion indicators, the emotion indicators "excellent" and "good" are sorted into a positive group. If the weight values for the emotion indicators "excellent" and "good" are "3" and "2", respectively, and the emotion indicator "excellent" was used twice within the body of the email and the emotion indicator "good" was used once within the body of the email, then $$P(pos) = \left(3 \times \frac{2}{20}\right) + \left(2 \times \frac{1}{20}\right) = 0.4.$$

In operation 316, an attitude factor may be calculated. In certain embodiments, calculating the attitude factor for an email within an email thread may include utilizing both the probability of an emotion value for a group of positive emotion indicators and the probability of an emotion value for a group of negative emotion indicators. In various embodiments, an attitude factor may be based upon a ranking system. Within the ranking system, based upon an attitude factor calculation, there may be a plurality of thresholds representative of varying levels of emotion.

For example, an attitude factor, "A", for an email may be calculated using the equation: A(email)=P(pos)−P(neg), where P(pos) may be the probability of an emotion value for a group of positive emotion indicators and P(neg) may be the probability of an emotion value for a group of negative emotion indicators. If A(email) is greater than zero, then the attitude factor of the email may be positive. If A(email) is negative, then the attitude factor of the email may be negative. If A(email) is equal to zero, then the attitude factor of the email may be pending. In addition, there may be numerical thresholds within the positive and negative attitude factor results that provide a more granular scale of emotion. For instance, an A(email) score of 0.4 may be representative of an attitude factor of "happy" whereas an A(email) score of 2 may be representative of an attitude factor of "ecstatic."

Figure 4:
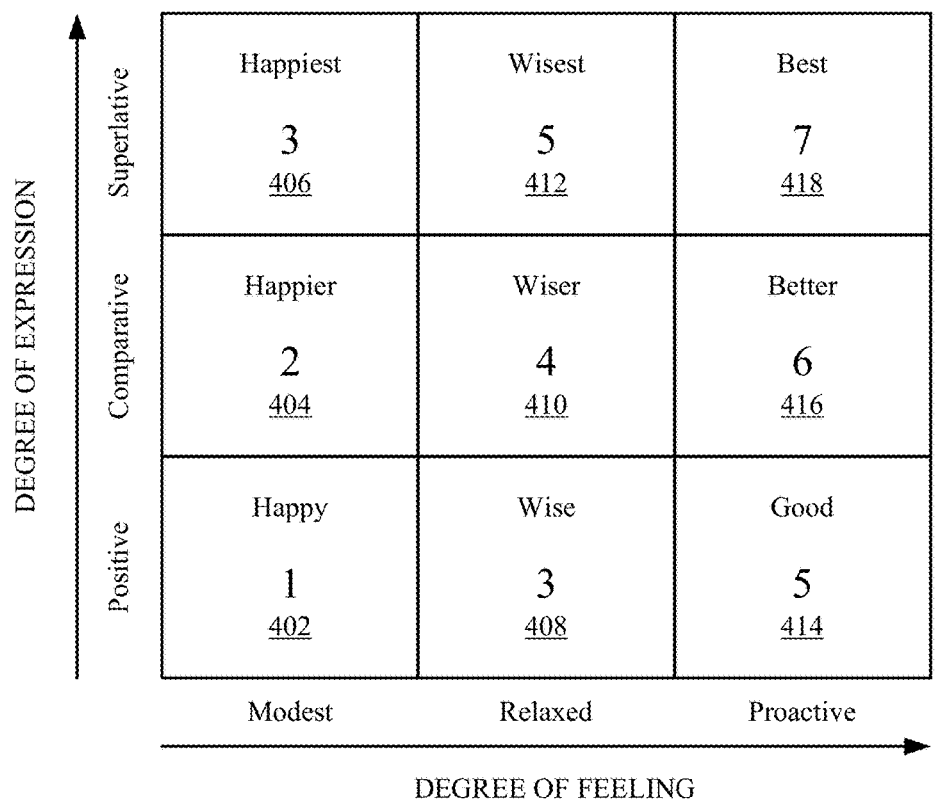
FIG. 4 depicts a weights assignment matrix utilized by the emotion indicator dictionary, according to embodiments.

FIG. 4 illustrates a weights assignment matrix utilized by the emotion indicator dictionary, according to embodiments. In certain embodiments, the emotion indicator dictionary may utilize word definitions from an authoritative source definition to generate FIG. 4, containing modules 402-418. The X-axis of FIG. 4 may represent the degree of feeling for a word while the Y-axis may represent the degree of expression for a word. The degree of feeling for a word may indicate a level of intensity of a word while the degree of expression for a word may indicate a style of speech or usage of a word within a specific context. As both the degree of feeling and the degree of expression increase, the weight values assigned to emotion indicators may also increase. For example, the word "Happy" in module 402 is a modest feeling of positivity and is assigned a weight value of "1." As the style of speech changes, the weight values get larger, as indicated by the word "Happier" in module 404 with a weight value of "2" and for the word "Happiest" in module 406 with a weight value of "3." In various embodiments, the emotion indicator dictionary may utilize a degree matrix similar to FIG. 4 for more specific parts of speech applications, such as a degree matrix for verbs or adjectives.

FIG. 5 illustrates an example of pseudocode that forms the emotion indicator dictionary, according to embodiments. The pseudocode may include for each emotion indicator within the emotion indicator dictionary, an emotion indicator profile. The emotion indicator profiles 502-508 may include information such as an identification number associated with the emotion indicator as well as the weight value for the emotion indicator. In various embodiments, the profile of an emotion indicator may change based upon a sender class. In further embodiments, the emotion indicator dictionary may have a plurality of emotion indicator profiles for a single emotion indicator. For example, the weight value for an emotion indicator used by the president of a company may be "3" whereas the weight value for the same emotion indicator used by an entry level employee of the same company may be "1."

Figure 6:
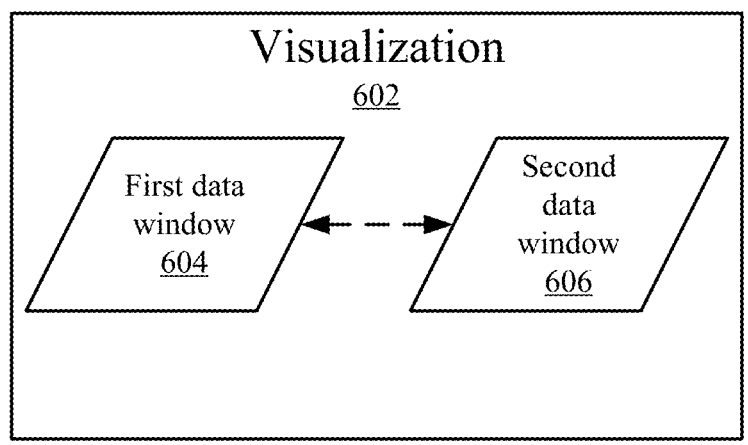
FIG. 6 depicts a block diagram illustrating a visualization with two data windows, according to embodiments.

FIG. 6 depicts a block diagram illustrating a visualization with two data windows, according to embodiments. Aspects of FIG. 6 may be similar or the same as aspects as described in FIG. 1 with respect to the visualization 116. The visualization 602 may include a first data window 604 and a second data window 606. The first data window 604 may include a generated emotion function chain. The second data window 606 may include the body of an email used to calculate an individual attitude factor within an emotion function chain. In embodiments, the first data window 604 and the second data window 606 may be individual, separate windows displayed within the same graphical user interface within a single monitor. In various embodiments, the first data window 604 and the second data window 606 may be within the same window and may be accessible through an identifier (e.g., labeled tabs, symbolic links). The second data window 606 may be displayed after a user interaction with the first data window 604. In certain embodiments, the first data window 604 and the second data window 606 may be generated and displayed simultaneously.

Figure 7:
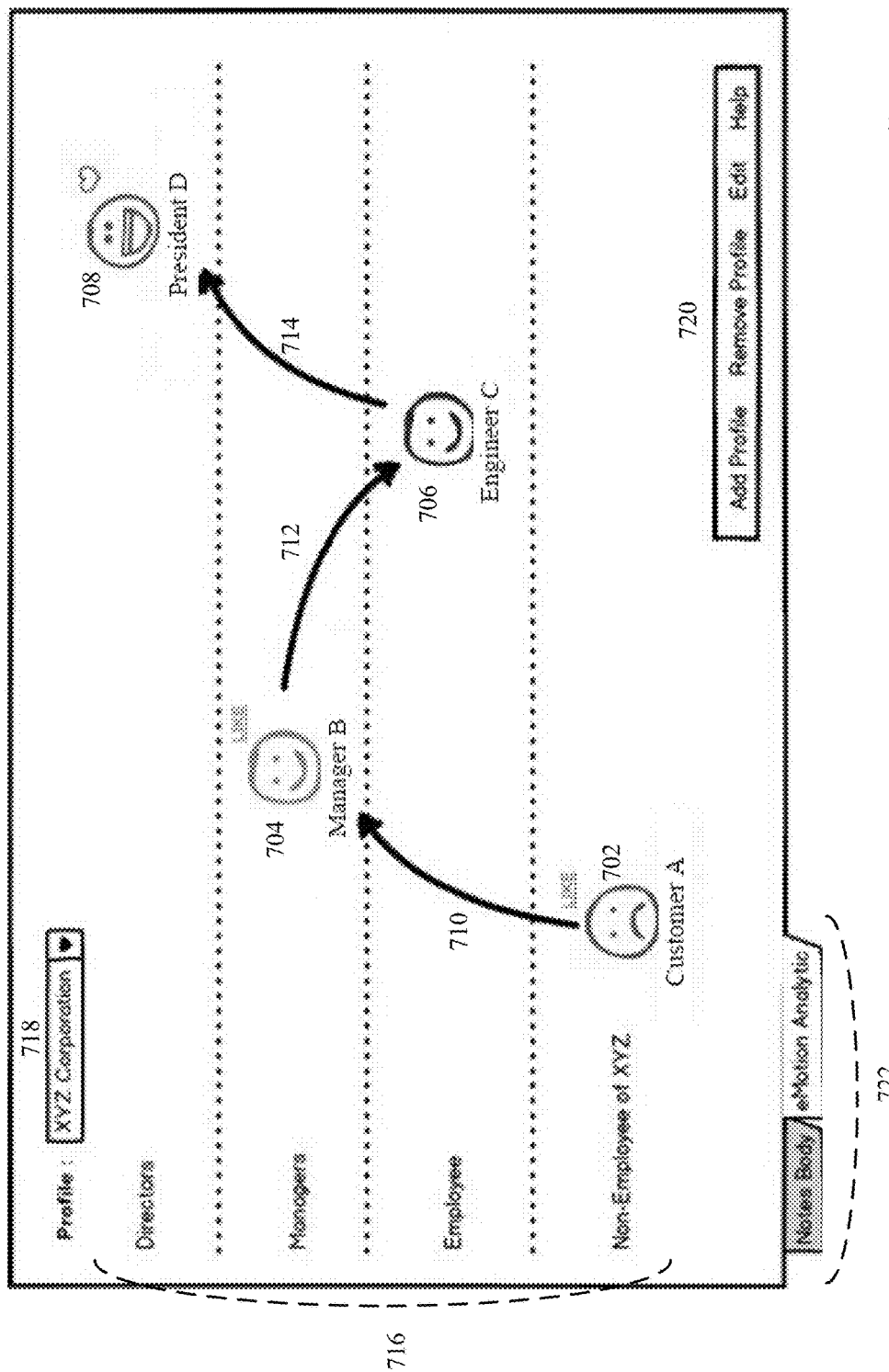
FIG. 7 depicts an example generated window of an emotion function chain, according to embodiments.

FIG. 7 depicts an example generated window of an emotion function chain, according to embodiments. A generated emotion function chain may include pictorial depictions of attitude factors 702-708, markers 710-714, sender classes 716, a profile 718, an editing toolbar 720, and window tabs 722.

The pictorial depictions of attitude factors 702-708 may represent calculated attitude factors for individual emails from an email thread. For example, the pictorial depiction of the attitude factor 702 displays a "sad face." In embodiments, the "sad face" of the attitude factor 702 indicates that the A(email) score for that email is a negative value. Conversely, the attitude factors of 704, 706, and 708 display a variety of "happy faces", indicating that the A(email) score for attitude factors 704, 706, and 708 are positive values. In embodiments, differences in positive or negative depicted attitude factors may indicate varying levels of emotion. For example, attitude factors 704 and 706 display "happy faces" whereas attitude factor 708 displays a more pronounced "happy face." The differences in the depicted attitude factors 704-708 may be attributable to varying levels of A(email) scores, where the A(email) score of 0.4 may represent the depicted attitude factor 706 and the A(email) score of 2 may represent the depicted attitude factor of 708.

The pictorial depictions of attitude factors 702-708 may be connected together by way of markers 710-714. In embodiments, the markers 710-714 may include directional arrows. In certain embodiments, the markers 710-714 may indicate discussion relationships within an email thread. Discussion relationships may refer to the relation of email replying, email forwarding, or importance level (e.g., "Urgent!") within an email thread. For example, marker 710, pointing from the attitude factor 702 to the attitude factor 704 may indicate that the email thread participant associated with the attitude factor 702 has forwarded an email to the email thread participant associated with the attitude factor 704. In further embodiments, discussion relationships may refer to reference relationships. For example, if an email user desired to refer to an older email instance not within a current email thread but related to an email within the current email thread, the user may tag the older email, and the emotion function chain may be generated with the older email and the current email thread, where the older email is connected to the related email within the current email thread by a marker.

The pictorial depictions of attitude factors 702-708 may be differentiated based upon a plurality of sender classes 716. In embodiments, displaying the emotion function chain may include geometrically differentiating attitude factors based upon sender class. For example, the attitude factor 702 has a designated sender class of "Non-Employee of XYZ" and above the attitude factor 702 is the attitude factor 704, who has a designated sender class of "Manager." In certain embodiments, the geometric differentiation of sender classes may be based upon status or authority (e.g., job role/job title). For instance, the attitude factor 708 is above the attitude factor 706, where the attitude factor 708 was calculated from an email written by the president of XYZ and the attitude factor 706 was calculated from an email written by an engineer of XYZ. The sender classes may be determined in a manner similar or the same to operation 206 as discussed in FIG. 2.

The illustrated emotion function chain includes a profile 718. The profile 718 includes a selectable drop down menu such that a user may view separate emotion function chains based upon which profile the email thread participants belong to. In embodiments, the profile 718 may be one or more individuals. The drop down menu may contain the names of all of the participants in an email thread, and a user may be able to view the emotion changes of a single participant throughout an email thread. In various embodiments, the profile 718 may be a category. A category may group sender classes together based upon a common attribute. The common attribute may be identified using natural language processing techniques previously discussed for operation 214 of FIG. 2 or may be user defined. For example, an email thread with participants who are personally related to one another may be grouped into a category defined as "family." In another example and as illustrated in FIG. 7, an email thread involving a business deal with a customer and several employees of the XYZ Corporation may be grouped into a category defined as "XYZ Corporation."

The generated emotion function chain may be edited after it is displayed utilizing an editing toolbar 720. The editing toolbar 720 may allow a user to add additional profiles to a generated emotion function chain. The editing toolbar 720 may also allow a user to remove profiles from a generated emotion function chain. In embodiments, the editing toolbar may allow a user to manipulate the generated emotion function chain as it relates to the needs of the user. For example, a user may reorder the geometric differentiation of sender classes to prioritize individuals, the user may link depicted attitude factors with separate email threads, or the user may contribute to or edit the data associated with a participant of an email thread collected during the attitude factor calculation (e.g., updating out of date information as it relates to the email thread participant associated with the depicted attitude factor).

The generated emotion function chain may include one or more windows 722. Aspects of FIG. 7 may be similar or the same as aspects described in FIG. 6 with respect to the first data window 604 and the second data window 606. The windows 722 may allow a user to navigate from a generated emotion function chain to the bodies of the emails from an email thread used to generate the emotion function chain. For example, the tab entitled "eMotion Analytic" may display the emotion function chain whereas the tab entitled "Notes Body" may display the bodies of the emails. In various embodiments, a user may generate a plurality of tabs linking the emotion function chain to bodies of emails by interacting with each attitude factor within the emotion function chain, where the tabs are labeled according to a name of a participant associated with the attitude factor.

Figure 8:
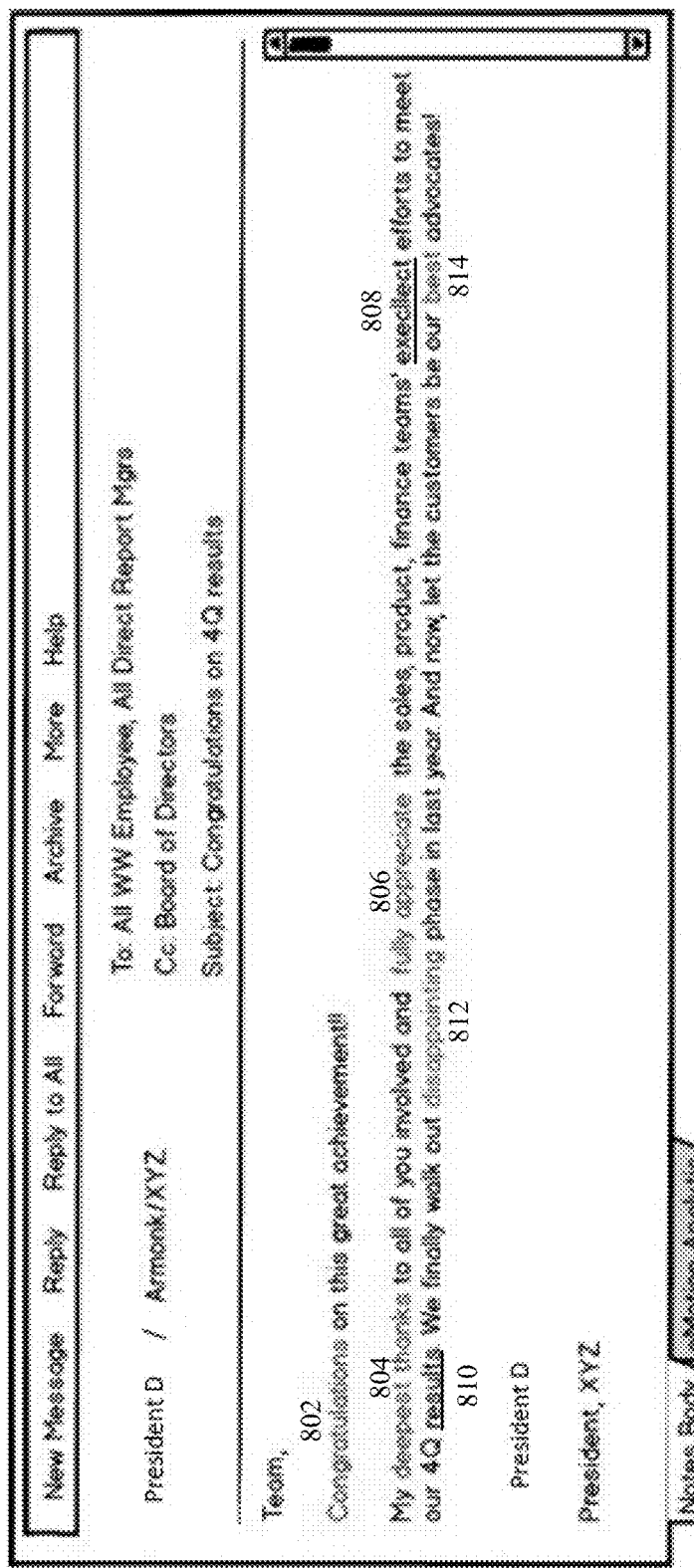
FIG. 8 depicts an example rendered window of the body of an email linked to an emotion function chain, according to embodiments.

FIG. 8 depicts an example rendered window of the body of an email linked to an emotion function chain, according to embodiments. The body of an email linked to an emotion function chain may include visually differentiated emotion indicators 802-814. In embodiments, visually differentiating may include highlighting (e.g., 802-806, 812-814), coloring according to sentiment (e.g., red for negative, yellow for pending, green for positive, grey for no emotion), underlining (e.g., 808-810), and similar techniques (e.g., italicizing, bolding). The body of an email may be displayed in response to a user interaction with the emotion function chain, or may be generated simultaneously with the emotion function chain. A user may navigate between the body of an email and the emotion function chain through a series of labeled tabs 816. Aspects of FIG. 8 may be similar or the same as aspects described in FIG. 6 with respect to the first data window 604 and the second data window 606 and may be similar or the same as aspects described in FIG. 7 with respect to the windows 722.

Figure 9:
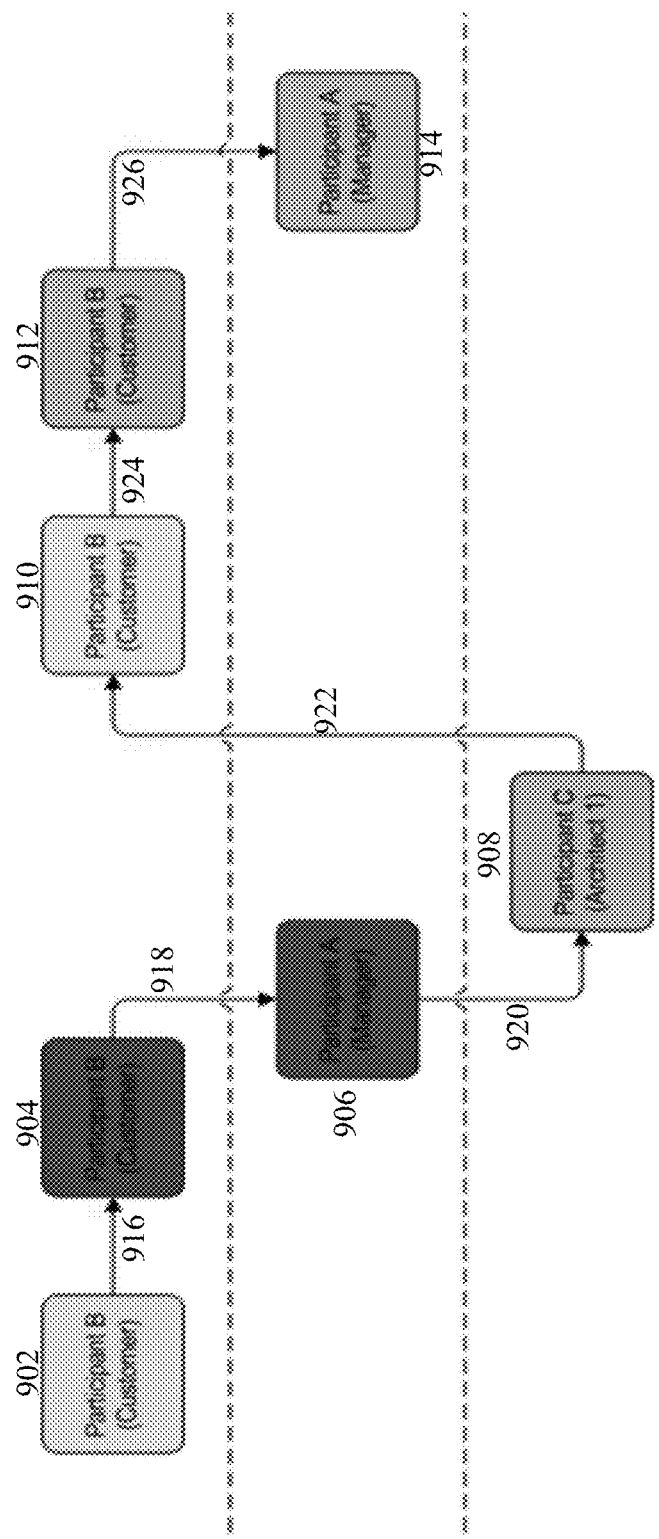
FIG. 9 depicts a generated emotion function chain with attitude factors displayed as modules with textual tags, according to embodiments.

FIG. 9 depicts a generated emotion function chain with attitude factors displayed as modules with textual tags, according to embodiments. Aspects of FIG. 9 may be similar or the same as aspects described in FIG. 8 and FIG. 9. An emotion function chain may include attitude factors 902-914 depicted as modules. In embodiments, the attitude factor modules 902-914 may represent each instance of an email within an email thread. The attitude factor modules 902-914 may be connected by markers 916-926. The markers 916-926 may indicate a relationship one email instance has with another. For example, the marker may indicate the relation of email replying or forwarding or it may represent an importance level (e.g., priority markings). In certain embodiments, if a user wants to refer to an older email, the user may place a tag in the older email. By placing a tag in the older email, the user may build a link between the older email tagged and an email currently being viewed. The markers may present a relationship from the older email tagged to the email currently being viewed.

In various embodiments, a user may display the body of an email instance associated with an attitude factor module by interacting with the attitude factor modules (e.g., selecting/clicking). In further embodiments, the body of an email instance associated with an attitude factor may be displayed in a separate window within the same graphical user interface. Displaying the body of an email instance associated with an attitude factor may include identifying/marking emotion indicators used to calculate the attitude factor with a color schema.

In certain embodiments, the modules may be visually differentiated according to a color schema. The color schema may include coloring specific attitude factors with different colors (e.g., blue for sad, red for angry, green for happy). In further embodiments, the color scheme used to visually differentiate the attitude factor modules may be the same color schema used to visually differentiate identified emotion indicators within the body of an email.

The attitude factor modules 902-914 may include data associated with a user. In embodiments, the attitude factor modules 902-914 may include textual tags indicating the sender class of the user associated with the email instance. For example, the attitude factor module 902 includes data associated with a user (e.g., participant B, which may include contact information or previous attitude factor calculation results) and the sender class of the user (e.g., customer, Manager). The textual tags may be used to group different email senders to simplify the display of the emotion function chain. In various embodiments, the emotion function chain may be filtered out by a user. Filtering may include removing attitude factor modules (e.g., removal based on sender class), only displaying attitude factor modules with a particular sentiment (e.g., removing all modules with a positive attitude factor), or removing the color schema.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer program product for displaying an emotion function chain from an email thread, the computer program product comprising a computer readable storage medium having program instructions embodied therewith, wherein the computer readable storage medium is not a transitory signal per se, the program instructions executable by a processor to cause the processor to perform a method comprising:

identifying a first signature line in a first email and a second signature line in a second email, wherein the first signature line includes a first signature and the second signature line includes a second signature;

extracting the first signature from the first email and the second signature from the second email;

determining an identity of the first user using the first signature and an identity of a second user using the second signature;

accessing a signature repository to retrieve user data using the determined identities of the first and second users, wherein the user data includes sender class data of the first user and sender class data of the second user;

determining that the sender class data of the first user and the second user includes a same sender class;

grouping at least the first email and the second email together based on the first and second emails being sent by users having a same sender class;

transmitting, in response to grouping the first email and the second email together, an email thread to an email content analyzer on an email application hosted by a computer system;

receiving, at the email content analyzer, the email thread comprising at least the first email and the second email, wherein receiving the email thread includes receiving the first email and the second email based on the sender class;

extracting, in response to receiving the email thread, a first set of emotion indicators from a body of the first email and a second set of emotion indicators from a body of the second email, wherein the first set of emotion indicators from the first email include one or more words from the body of the first email and the second set of emotion indicators from the second email include one or more words from the body of the second email, the one or more words from the body of the first email and the one or more words from the body of the second email being one or more positive words, comparative words, and superlative words;

determining, based upon the first set and the second set of emotion indicators, a first attitude factor for the first email and a second attitude factor for the second email;

displaying in a first window on a computer display of the computer system, based upon the first attitude factor and the second attitude factor, an emotion function chain including a pictorial depiction of the attitude factor for the first email and a pictorial depiction of the attitude factor for the second email, wherein the respective pictorial depictions of the attitude factors for the first and second emails are based upon the sender class, and wherein a marker connects the respective pictorial depictions of the attitude factors for the first and second emails, the marker indicating that the second email is a reply to the first email; and displaying, in a second window on the computer display, the body of the first email in response to a user interaction with the pictorial depiction of the attitude factor for the first email.

2. The computer program product of claim 1, wherein displaying the body of the first email includes visually differentiating the first set of emotion indicators identified in the first email from the body of the first email.

3. The computer program product of claim 1, wherein a first sender of the first email and a second sender of the second email are grouped into a category, wherein the category is based upon a common attribute of the first sender and the second sender.

4. The computer program product of claim 1, wherein determining the attitude factor for the first email and the second email includes: receiving weight values for each emotion indicator using an emotion indicator dictionary, wherein the emotion indicator dictionary includes the one or more positive words, comparative words, and superlative words; calculating, using the emotion indicators and the weight values, a probability of an emotion value of the first email and a probability of an emotion value of the second email; and determining, based upon the probability of the emotion value of the first email and the second email, the attitude factor for the first email and the attitude factor for the second email.

5. The computer program product of claim 4, wherein receiving weight values for each emotion indicator using the emotion indicator dictionary further comprises: accessing the emotion indicator dictionary; and determining a degree of expression for each emotion indicator, wherein the degree of expression for a particular emotion indicator is based on whether the particular emotion indicator is a positive word, a comparative word, or a superlative word.

6. The computer program product of claim 5, wherein determining the degree of expression for each emotion indicator further comprises: identifying a ranking of the degree of expression for the positive word, the comparative word, and the superlative word, wherein the positive word has a degree of expression below both the comparative word and the superlative word, the comparative word has a degree of expression above the positive word and below the superlative word, and the superlative word has a degree of expression above both the positive word and the comparative word.

7. The computer program product of claim 6, further comprising: determining a degree of feeling for each emotion indicator, wherein the degree of feeling for a respective emotion indicator is based on whether the respective emotion indicator is either a modest word, a relaxed word, or a proactive word.

8. The computer program product of claim 7, wherein determining the degree of feeling for each emotion indicator further comprises: identifying a ranking of the degree of feeling for the modest word, the relaxed word, and the proactive word, wherein the modest word has a degree of expression below both the relaxed word and the proactive word, the relaxed word has a degree of expression above the modest word and below the proactive word, and the proactive word has a degree of expression above both the modest word and the relaxed word.

9. The computer program product of claim 1, wherein extracting the first set of emotion indicators from the body of the first email and the second set of emotion indicators from the body of the second email further comprises: identifying one or more functional words in the body of the first email and in the body of the second email, wherein functional words include articles, pronouns, adpositions, conjunctions, auxiliary verbs, interjections, particles, expletives and pro-sentences; and determining, based on identifying the one or more functional words in the body of the first email and in the body of the second email, to not extract the functional words with the first set of emotion indicators and the second set of emotion indicators.

10. The computer program of claim 1 further comprising: receiving a third email, wherein the third email includes a third signature line, the third signature line including a third signature and information associated with a third user; identifying the third signature; accessing the signature repository, wherein the signature repository does not contain sender class data of the third user associated with the third signature; and registering the third user within the signature repository, wherein the third user is registered by recording the third signature and information associated with the third user in the signature repository.

11. A computer system for displaying an emotion function chain from an email thread, the computer system comprising:
a memory; and
a processor in communication with the memory, wherein the processor is configured to perform a method, the method comprising:
identifying a first signature line in a first email and a second signature line in a second email, wherein the first signature line includes a first signature and the second signature line includes a second signature;

extracting the first signature from the first email and the second signature from the second email;

determining an identity of the first user using the first signature and an identity of a second user using the second signature;

accessing a signature repository to retrieve user data using the determined identities of the first and second users, wherein the user data includes sender class data of the first user and sender class data of the second user;

determining that the sender class data of the first user and the second user includes a same sender class;

grouping at least the first email and the second email together based on the first and second emails being sent by users having a same sender class;

transmitting, in response to grouping the first email and the second email together, an email thread to an email content analyzer on an email application hosted by the computer system;

receiving, at the email content analyzer on the email thread comprising at least the first email and the second email, wherein receiving the email thread includes receiving the first email and the second email based on a sender class;

extracting, in response to receiving the email thread, a first set of emotion indicators from a body of the first email and a second set of emotion indicators from a body of the second wherein the first set of emotion indicators from the first email are one or more words from the body of the first email and the second set of emotion indicators from the second email are one or more words from the body of the second email, the one or more words from the first body of the first email and the one or more words from the body of the second email being one or more positive words, comparative words, and superlative words;

determining, based upon the first set and the second set of emotion indicators, a first attitude factor for the first email and a second attitude factor for the second email;

displaying in a first window on a computer display of the computer system, based upon the first attitude factor and the second attitude factor, an emotion function chain including a pictorial depiction of the attitude factor for the first email and a pictorial depiction of the attitude factor for the second email, wherein the respective pictorial depictions of the attitude factors for the first and second emails are based upon the sender class, and wherein a marker connects the respective pictorial depictions of the attitude factors for the first and second emails, the marker indicating that the second email is a reply to the first email; and displaying, in a second window on the computer display, the body of the first email in response to a user interaction with the pictorial depiction of the attitude factor for the first email.

12. The system of claim 11, wherein displaying the body of the first email includes visually differentiating the first set of emotion indicators identified in the first email from the body of the first email.

13. The system of claim 11, wherein the second email is a reply to the first email, the first email and the second email being nonconsecutive in the email thread.

14. The system of claim 11, wherein determining the attitude factor includes: receiving weight values for each emotion indicator using an emotion indicator dictionary wherein the emotion indicator dictionary includes the one or more positive words, comparative words, and superlative words; calculating, using the emotion indicators and the weight values, a probability of an emotion value of the first email and a probability of an emotion value of the second email; and determining, based upon the probability of the emotion value of the first email and the second email, the attitude factor for the first email and the attitude factor for the second email.

* * * * *